United States Patent [19]

Langer et al.

[11] Patent Number: 4,737,367

[45] Date of Patent: Apr. 12, 1988

[54] FRUIT DRINK WITH VITAMINS

[76] Inventors: David W. Langer, 9227 E. Florence Ave., #8; Nathan Langer, 9933 Pangborn Ave., both of Downey, Calif. 90240

[21] Appl. No.: 759,413

[22] Filed: Jul. 26, 1985

[51] Int. Cl.$^4$ .......................... A23L 1/302; A23L 2/00
[52] U.S. Cl. ............................:............ 426/72; 426/599
[58] Field of Search ................ 426/72, 590, 599, 615, 426/616, 330, 330.3, 330.5

[56] References Cited

U.S. PATENT DOCUMENTS

| 1,886,931 | 8/1930 | Alexander | 426/616 |
|---|---|---|---|
| 2,919,195 | 12/1959 | Block | 426/72 |
| 4,038,421 | 7/1977 | Mendy et al. | 426/72 |

FOREIGN PATENT DOCUMENTS 75114 8/1982 European Pat. Off. .............. 426/72

Primary Examiner—Raymond N. Jones
Assistant Examiner—Carolyn Paden
Attorney, Agent, or Firm—Fulwider, Patton, Rieber, Lee & Utecht

[57] ABSTRACT

An improved, tasty fruit flavored beverage containing all or a substantial portion of the U.S. Recommended Daily Allowance of vitamins. The beverage is predominantly a mixture of about 10% to 60% (by volume) orange juice and about 20% to 70% (by volume) pineapple juice. Apple, grape and pear juices and apricot, peach, nectarine and banana purees may be added to develop a more flavorful taste.

8 Claims, No Drawings

FRUIT DRINK WITH VITAMINS

BACKGROUND OF THE INVENTION

This invention generally relates to the field of fruit flavored drinks such as fruit juices and, particularly, to such beverages having high concentrations of vitamins.

The need for a daily intake of vitamins is widely recognized. However, the dietary consumption of most people does not include the proper amount and the variety of vitamins which are essential for good health and well being. The U.S. Recommended Daily Allowance (RDA) of vitamins are generally considered to be as follows:

| VITAMIN | U.S. RDA |
| --- | --- |
| A | 5000 I.U. |
| C (Ascorbic acid) | 90 mg |
| D | 400 I.U. |
| E (d alpha tocopherol succinate) | 30 I.U. |
| $B_1$ (Thiamine mononitrate) | 1.5 mg |
| $B_2$ (Riboflavin) | 1.7 mg |
| $B_6$ (Pyridoxine HCl) | 2 mg |
| $B_{12}$ | 6 mg |
| Niacin | 20 mg |
| Folic acid | 0.4 mg |
| Pantothenic acid | 10 mg |
| Biotin | 0.3 mg |

With an increased awareness of the need for vitamins, many people take vitamin supplements in the form of tablets, capsules, elixirs and the like. However, for the very young and the elderly and those who have strong gag reflexes, the taking of the Recommended Daily Allowance of vitamins in such forms is frequently not very acceptable.

For many years fruit juices and other fruit flavored drinks have been fortified with vitamins. However, in these cases the number of vitamins and the concentrations thereof have been very limited because of the rather severe effects such vitamin additions have on the taste and palatability of such additions.

Despite a significant effort on the part of many in the field, a substantial need still exists for an easy and palatable way for taking all or a substantial portion of the Recommended Daily Allowance for vitamins. The present invention provides a very tasty fruit flavored drink which satisfies that need.

SUMMARY OF THE INVENTION

The present invention is directed to a flavorful, fruit flavored beverage which has all or a large portion of the Recommended Daily Allowance of vitamins in a single serving of such drink.

The beverage of the present invention is predominantly a mixture of citrus fruit juices and tropical fruit juices. The amount of citrus fruit juice ranges from about 10% to about 60% (by volume), preferably about 25% to 50%, and the tropical fruit juice ranges from about 20% to about 70% (by volume), preferably about 30% to 60%. The citrus fruit juices are juices from one or more fruits selected from the group consisting of orange, grapefruit, lemon, lime, tangerine and mandarin orange. The tropical fruit juices are juices from one or more fruits selected from the group consisting of pineapple, passion fruit, papaya, guava and tamarind. Preferably, at least half of the citrus fruit juice is orange juice and at least half of the tropical fruit juice is pineapple juice. Other additions to the beverage include up to about 40% (by volume) of one or more juices selected from the group consisting of apple juice, pear juice and grape juice and up to 25% (by volume) of a puree formed from a fruit selected from the group consisting of apricot, peach and nectarine. Additionally, up to 15% of a banana puree may be included. The above proportions are based upon a single strength juice which is defined as the natural juice without dilution or concentration.

The vitamin concentrations in the fruit flavored drink of the invention range from about 25% to about 200% of the Recommended Daily Allowance for vitamins based upon a single serving size of 8 ounces. The flavors of vitamin $B_1$, niacin, pantothenic acid and folic acid are the most difficult to cover or hide at the concentrations used. Other vitamins may be just as unpalatable, but they are used at such low concentrations that they do not significantly affect the overall taste of the fruit flavored beverage. At vitamin concentrations less than 25% of the Recommended Daily Allowance, the concentrations for all vitamins are low enough to have minimal effect on the overall taste of a fruit flavored beverage containing vitamins at that level. At vitamin concentrations above 200% of the Recommended Daily Allowance, masking the bad flavor of the vitamins is most difficult, if not impossible.

Single strength citrus fruit juices or tropical fruit juices by themselves in an 8 ounce serving will not completely mask the disagreeable tastes of vitamins within the range of 25%–200% of the Recommended Daily Allowance thereof. However, in accordance with the present invention, the mixture of citrus fruit juices and tropical fruit juices in the proportions described effectively mask the taste of vitamins in the above concentrations and, moreover, will provide a very tasty fruit flavored drink. Other added fruit juices, such as grape juice, apple juice and pear juice do not significantly mask the unpalatable flavors of vitamins at high concentrations although they may improve the overall flavor of the beverage. Apricot, peach and banana purees have similar effects inasmuch as they add desirable flavors, but do not significantly mask the taste of the vitamins.

As an example of the above masking effects of the individual citrus fruit juice and tropical fruit juice, vitamins were added to 8 ounce servings of orange juice and pineapple juice, both at single strength, at levels of 50%, 100% and 200% of the Recommended Daily Allowance for the vitamins listed in the table. The orange juice exhibited a bitter metallic taste which increased in severity with increasing concentrations of vitamins. The pineapple juice exhibited a fishy taste and a non-fruity aroma which likewise increased in severity with increasing concentrations of vitamins. Eight ounce servings of a 50%—50% mixture of orange and pineapple juices effectively masked the taste of the vitamins at all of the above concentrations.

The following is an example of an 8 ounce serving of the fruit flavored drink of the invention. All of the fruit ingredients are single strength.

| FRUIT JUICE | CONCENTRATION |
| --- | --- |
| Pineapple juice | 35% |
| Apple juice | 17% |
| Orange juice | 16% |
| Grape juice | 10% |
| Apricot puree | 8% |

| -continued | |
|---|---|
| FRUIT JUICE | CONCENTRATION |
| Peach puree | 8% |
| Banana puree | 6% |

The vitamins listed in the table were added to the beverage in the amounts noted therein. The drink was very tasty and exhibited no off-flavors or aromas from the added vitamins.

The fruit flavored beverage of the invention is prepared by mixing the juices and purees, adding the vitamins, usually in the form of powders, in the proper proportions, pasteurizing at 185° F., then vacuum packing the juice in appropriate containers such as cans or bottles. Various preservatives may be added to the beverage in lieu of pasteurization. If desired, the beverage may also be concentrated and frozen for storage, to be reconstituted at a later time with water to the desired concentration.

The juices utilized may be natural juices or artificial preparations, although natural juices are by far the preferred fruit flavored fluid because of the more natural taste. Fruit pulp may also be added if desired. Other modifications and improvements may be made to the invention without departing from the scope of the invention.

We claim:

1. A fruit flavored beverage which is predominantly a mixture of citrus fruit juice and tropical fruit juice, the beverage consisting essentially of, on the basis of a single strength eight-ounce serving:
   (a) from about 10% to about 60% by volume of citrus fruit juice, from about 20% to about 70% by volume of tropical fruit flavored juice, an effective amount of up to 40% by volume of other fruit juices selected from the group consisting of apple, grape, and pear juices and up to 35% by volume of fruit puree selected from the group consisting of apricot puree, peach puree, nectarine puree and banana puree; and
   (b) from about 25% to 200% of the recommended daily amounts of a plurality of vitamins selected from the group consisting of vitamin $B_1$, pantothenic acid or suitable salts thereof, niacin and folic acid or suitable salts thereof.

2. The fruit flavored beverage of claim 1, wherein the citrus fruit juice is selected from the group consisting of orange, lemon, lime and tangerine juices.

3. The fruit flavored beverage of claim 1, wherein the tropical fruit juice is selected from the group consisting of pineapple, passion fruit, papaya, guava and tamarind juices.

4. The fruit flavored beverage of claim 1, wherein the citrus fruit juice is orange juice and the tropical fruit juice is pineapple juice.

5. The fruit flavored beverage of claim 1, wherein said fruit juices are natural fruit juices or purees.

6. The fruit flavored beverage of claim 1, including from 25% to 200% of the recommended daily allowance of vitamins selected from the group consisting of vitamin A, vitamin C, vitamin D, vitamin E, Vitamin $B_2$, vitamin $B_6$, vitamin $B_{12}$ and biotin.

7. The fruit flavored beverage of claim 1, wherein the citrus fruit juice ranges from about 25% to about 50% (by volume).

8. The fruit flavored beverage of claim 1, wherein the tropical fruit juice ranges from about 30% to about 60% (by volume).

* * * * *